(12) United States Patent
Inoue

(10) Patent No.: US 6,512,877 B2
(45) Date of Patent: Jan. 28, 2003

(54) OPTICAL FIBER ARRAY

(75) Inventor: Masakatsu Inoue, Aichi (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/812,719

(22) Filed: Mar. 20, 2001

(65) Prior Publication Data
US 2001/0024560 A1 Sep. 27, 2001

(30) Foreign Application Priority Data
Mar. 27, 2000 (JP) .......................... 2000-086177

(51) Int. Cl.7 ................................................ G02B 6/00
(52) U.S. Cl. ........................................ 385/137; 385/65
(58) Field of Search .......................... 385/137, 65, 71, 385/80, 83, 95, 96, 99

(56) References Cited

U.S. PATENT DOCUMENTS 5,024,497 A * 6/1991 Jebens ........................ 385/16
5,889,914 A 3/1999 Gentsu ....................... 385/137

FOREIGN PATENT DOCUMENTS

| EP | 0 704 732 A1 | 4/1996 |
| EP | 0 854 372 A1 | 7/1998 |
| EP | 0 926 101 A1 | 6/1999 |
| JP | 5-264868 | 10/1993 |
| JP | 10-260321 | 9/1998 |

OTHER PUBLICATIONS

Patent Abstracts of Japan vol. 012, No. 406 (p.777), Oct. 27, 1988 & JP 63 144310 A (Sumitomo Electric Ind. Ltd.), Jun. 16, 1988.
Patent Abstracts of Japan vol. 018, No. 031 (p.1677), Jan. 18, 1994 & JP 05 264868 A(OKi Electric Ind. Co. Ltd.), Oct. 15, 1993.
Patent Abstracts of Japan vol. 1996, No. 06, Jun. 28, 1996, & JP 08 036113 A (Sumitomo Electric Ind. Ltd.), Feb. 6, 1996.

* cited by examiner

Primary Examiner—Tulsidas Patel
(74) Attorney, Agent, or Firm—Burr & Brown

(57) ABSTRACT

A core wire (2b) of an optical fiber (2) on which a metalized layer is not formed is housed in a fixing groove (7) having a V shaped cross section. A solder (8) is filled into a space between holding portion (3b) of a support substrate (3) and an upper substrate (4), each having metalized layers (3c) and 4(a), respectively, formed thereon, and the core wire is fixed therebetween. The support and upper substrates are fixed to one another by being bonded with solder (8), which wets along each of the metalized layers. Optical fiber (2) pinched therebetween is free of a metalized layer, and as such, is free of the forces of bonding with the solder, and is securely fixed by the pinching force from both of the support and upper substrate faces. In this manner, there is provided an optical fiber array for fixing an optical transmission member such as an optical fiber to a predetermined position, wherein each optical transmission member can be securely fixed into a groove by using the solder, and a gap is unlikely to occur between the optical transmission member and the groove.

1 Claim, 2 Drawing Sheets

OPTICAL FIBER ARRAY

BACKGROUND OF THE INVENTION

1. Field of the Invention

The present invention relates to an optical fiber array for holding a light transmission member such as optical fiber at a predetermined position.

More particularly, the present invention relates to an optical fiber array to be sealed in a package of a holding device of the light transmission member together with an optical element connected to the light transmission member.

2. Description of Related Art

Conventionally, it has been well known that an optical fiber array for fixing an optical fiber that is a light transmission member and connecting the optical fiber to another member uses a support substrate having a fixing groove such as V groove formed in a plurality of arrays. On the support substrate, an optical fiber in which wires each having a ribbon shaped cover removed therefrom are housed and arranged in fixing grooves is held and fixed on an upper substrate. Then, this optical fiber array is coupled with other optical parts, for example, light emitting diode or light receiving elements, or is optically coupled with other optical fibers or rod lenses. As a method for forming the fixing groove, an etching technique is applied to a silicon substrate so as to fit a material for the support substrate or a grinding technique is applied to an optical glass or a ceramics substrate.

In a substrate of any material as well, if an optical axis of an optical fiber fixed between the support substrate and the upper substrate deviates from a predetermined position, a transmission loss between the optical fiber and another light transmission means increases. Therefore, it is required to achieve very high processing precision of the fixing groove on an optical fiber support substrate, for example, 0.5 micron or less. Thus, as means for fixing the support substrate and the upper substrate, there has been means for fixing an optical fiber into a V groove with a resin based adhesive. In addition, in order to avoid degradation of light emitting characteristics caused by adhering of an organic gas generated from a resin based adhesive to a light emitting interface of a light emitting diode, the above means has been improved to means for fixing the optical fiber in the V groove by way of soldering. Further, the diameter of an optical fiber is about 125 micron. If a solder is supplied from a distal end face of the support substrate into the V groove with its very small gap between the V groove and the optical fiber, a gap in which a solder is not supplied in the gap between the V groove and the optical fiber is likely to occur. Thus, the above means has been improved to means in which the light transmission member is housed in the groove, a solder sheet is placed on the groove and light transmission member, this solder sheet is heated while it is pressurized toward the groove via the upper substrate, whereby a solder is supplied into the gap between the groove and the light transmission member However, even in an optical fiber array in which the support substrate and the upper substrate are fixed to each other by means of a solder sheet, a solder wets in a longitudinal direction faster than the solder wetting and being filled in the peripheral direction of an optical fiber forming a metalized layer. Thus, for example, in the case where the upper substrate is pushed down suddenly, if a remaining gap extends long along the groove without the solder being filled sufficiently in the fixing groove, an inert gas wets through the gap in the groove. Thus, there has been an apprehension that air tightness of a package or case for preventing degradation of optical elements such as laser cannot be maintained.

Namely, the above package or the like housing an optical fiber array is often subjected to severer exterior environment. That is, such package or the like is subjected to a high temperature of 60° C. or to a low temperature of −40° C. or is subjected to extremely dry environment or humid environment. Thus, the optical fiber must operate constantly for a long time under such severe ambient environment. If a gap remains in the solder in the groove as described previously, the air remaining in this gap repeatedly expands and contracts, thereby moving the peripheral solder or moisture entering the gap. Therefore, the fixing position of the optical fiber slightly changes under the influence of such expansion and contraction. If the fixing position of the optical fiber is changed, even if such change is slight, the optical axis deviates from an optical axis of the optical element, and thus, a coupling loss increases or changes.

SUMMARY OF THE INVENTION

It is an object of the present invention to provide an optical fiber array for fixing a light transmission member such as optical fiber at a predetermined position, wherein each transmission member can be securely fixed into a groove by using a solder, and a gap between the light transmission member and the groove is unlikely to occur.

According to a first aspect of the present invention, there is provided an optical fiber array comprising: a support substrate for housing a light transmission member in a fixing groove; and an upper substrate for holding the light transmission member, said optical fiber array being sealed in a package of a holding device of the light transmission member together with an optical element connected to the light transmission member with air tightness, wherein a light transmission member at which a metalized layer is not formed is housed in a fixing groove of the support substrate at which the metalized layer is formed, and is soldered by the upper substrate at which the metalized layer is formed.

In this manner, the support substrate and upper substrate each having the metalized layer formed thereon are fixed to each other by being bonded with a solder wetting along the metalized layer. The light transmission member pinched therebetween is free of any metalized layer, is free of force of bonding with a solder, and is fixed by the pinching force from both faces. On the other hand, a solder surrounding the peripheral face of the light transmission member is small in wettability relevant to the light from the light transmission member, and is free of bonding force. Thus, before the solder wets along the light transmission member, it is pressed by the force of pinching between the support substrate and the upper substrate, moves in the peripheral direction, and is filled inside of the fixing groove. Therefore, no gap is provided between the light transmission member and the groove so that air tightness of a package or case for preventing degradation of an optical element such as laser could be held reliably. In addition, the array position of the optical fibers could be fixed. Thus, unlike a conventional example, there does not occur an increase or change of a coupling loss because the optical axis of the optical fiber deviates from that of the optical element.

The light transmission member is preferably an optical fiber, and may be a passive light transmission member such as rod lens. Although no particular limitation applies to an optical element optically coupled with the light transmission member, a laser light emitting element for oscillating laser light or a light receiving element for receiving laser light are preferable.

In addition, with respect to the surface roughness Ra of a light transmission member at which a metalized layer is not formed, an optical fiber array of 0.1 to −1 micron is preferable. In this manner, if the surface roughness is smaller than 0.1, bonding force weakens due to a change with time, and the fixing position of the optical fiber is displaced. Thus, there is an apprehension that deviation from the optical axis of the optical element occurs, thus causing an increase or change in coupling loss. On the other hand, if the surface roughness is greater than (1, the wettability of solder increases. Thus, there is a possibility that the solder moves in a longitudinal direction faster than solder filling in the peripheral direction, and air tightness is degraded in a gap in which the solder is not filled.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principle of the present invention.

DETAILED DESCRIPTION OF THE PREFERRED EMBODIMENTS

Figure 1A:
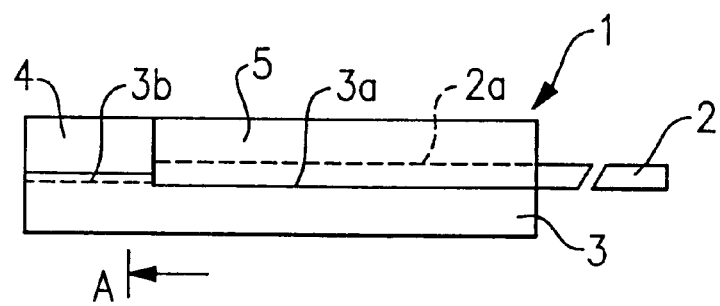
FIG. 1(a) is a front view schematically illustrating an optical fiber array.

Reference will now be made in detail to the presently preferred embodiments of the invention as illustrated in the accompanying drawings, in which like reference numerals designate like or corresponding parts.

Figure 1B:
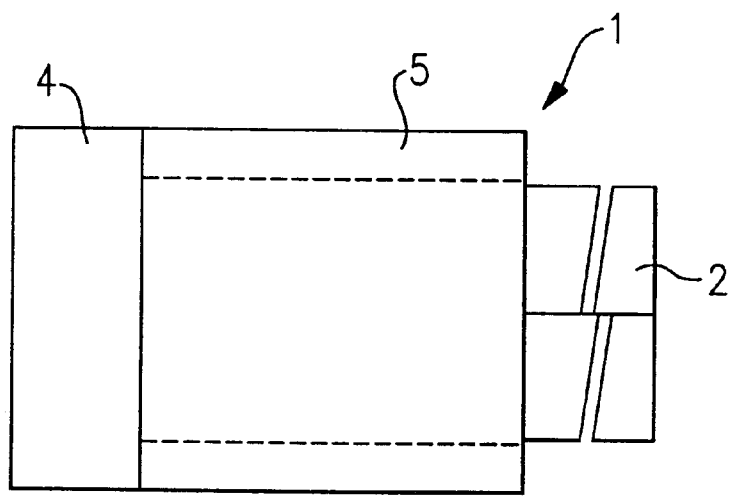
FIG. 1(b) is a plan view of the optical fiber array in FIG. 1(a)
Figure 1C:
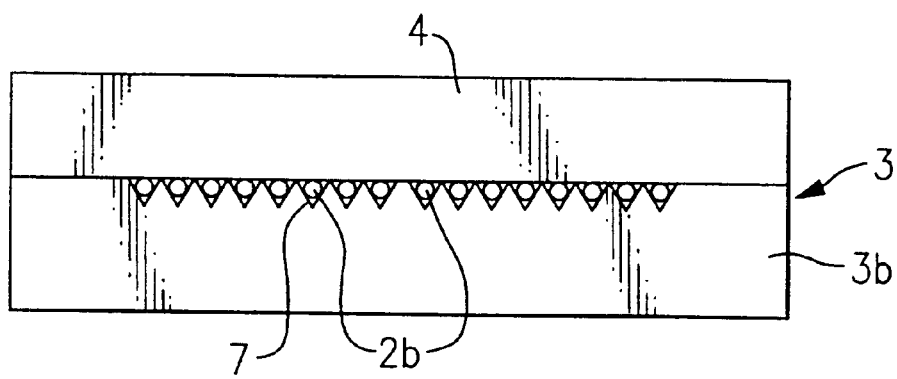
FIG. 1(c) is a left side view of the optical fiber array in FIG. 1(a)
Figure 2:
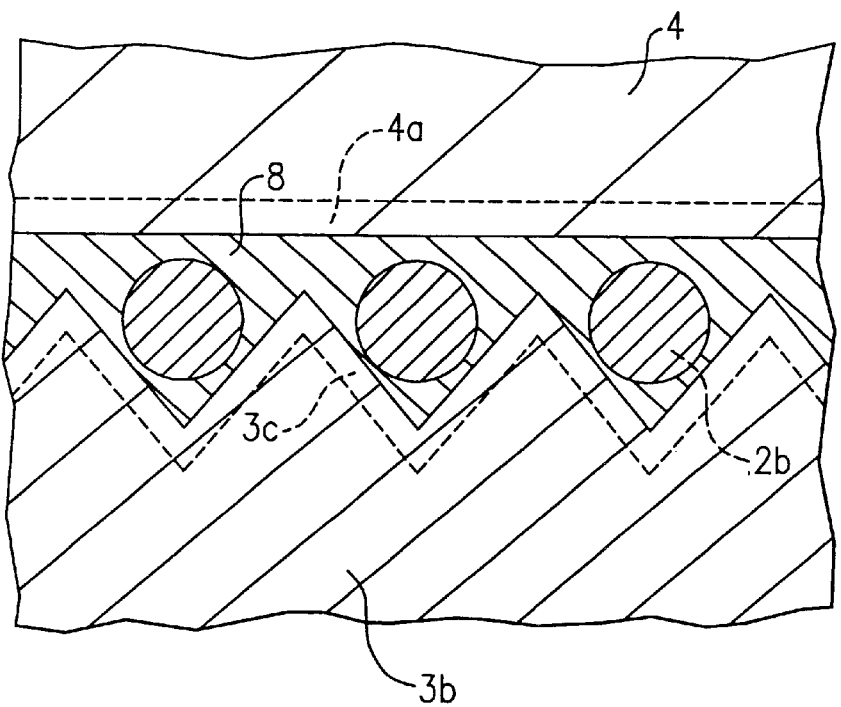
FIG. 2 is an illustrative view partially enlarging the vicinity of the optical fiber taken along sectional line A in FIG. 1(a)
Figure 3:
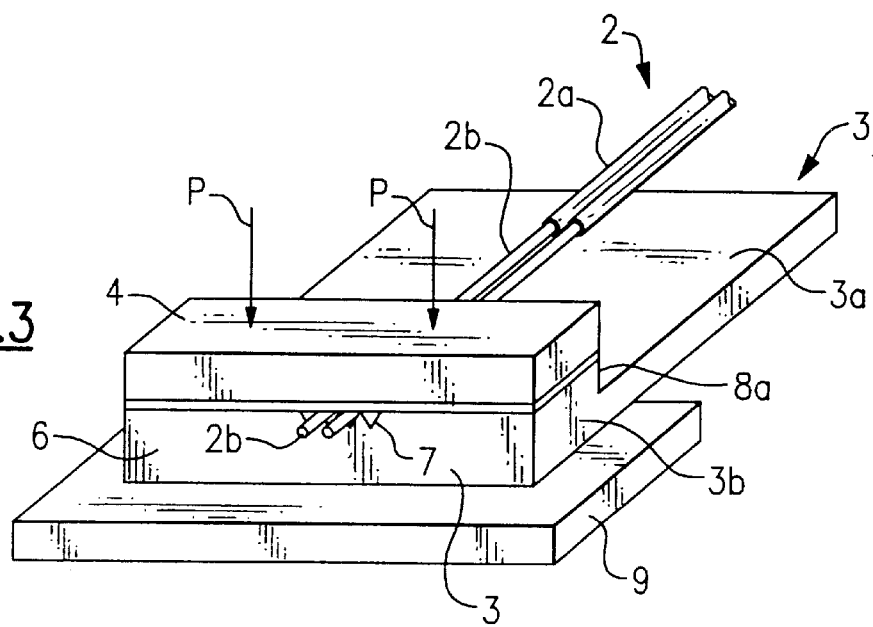
FIG. 3 is a perspective view showing one process of a manufacturing method in which a pressure is applied over an upper substrate 4, and a solder sheet 8a is fused.

Hereinafter, preferred embodiments of the present invention will be described with reference to the accompanying drawings. FIG. 1(a) is a front view schematically illustrating an optical fiber array according to the present invention. FIG. 1(b) is a plan view of the optical fiber array in FIG. 1(a). FIG. 1(c) is a left side view of the optical fiber array in FIG. 1(a). FIG. 2 is a sectional view showing the vicinity of the optical fiber. FIG. 3 is an illustrative view illustrating one process of manufacturing the optical fiber array. The diameter of the optical fiber or the thickness of various layers is small or thin, and thus, partially illustrated in an exaggerated manner.

This optical fiber array 1 comprises a cover cap portion 5 and an upper substrate 4 each pinching a cover portion 2a of an optical fiber 2 and a core wire 2b excluding the cover portion 2a of the optical fiber 2 relevant to a support substrate 3 on which the optical fiber 2 is placed. The support substrate 3 comprises a cover placement portion 3a for placing the cover portion 2a of the optical fiber 2 and a holding portion 3b having a step that corresponds to the thickness of the cover portion 2a. On the other hand, a groove portion is formed at the lower face of the cover cap portion 5, thereby fixing the cover portion 2a so as to cover the optical fiber 2 of the cover placement portion 3a. In addition, at the holding portion 3b of the support substrate 3, fixing grooves 7 in a predetermined number of arrays are formed, respectively, from an end face 6 of the holding portion 3b toward the cover placement portion 3a. Further, the core wire 2b of the optical fiber 2 is housed in each groove 7, and is fixed to the upper substrate 4 by means of a solder 8 according to the present invention.

As shown in FIG. 2 that is a sectional view of the holding portion 3b and upper substrate 4 in the vicinity of the optical fiber, the core wire 2b of the optical fiber 2 at which a metalized layer is not formed is housed in a fixing groove 7 whose sectional view is formed in V shape. The housed core wire is fixed by the holding portion 3b of the support substrate 3 and the upper substrate 4 each forming the metalized layer after the solder 8 has been filled. In this manner, the support substrate 3b forming a metalized layer 3c and the upper substrate 4 forming the metalized layer 4a are fixed to each other by being bonded with a solder 8 because the solder wets along each metalized layer. In addition, the optical fiber 2 pinched there between is free of a metalized layer, is free of the force of bonding with a solder, and is securely fixed by the pinching force from both top and bottom faces.

Now, a method of manufacturing an optical fiber array according to the present invention will be described here.

First, a support substrate 3 is manufactured, In manufacturing this substrate, silicon, ceramics and glass are employed as raw materials, and each groove is formed finely in depth of about 125 micron. Namely, a first method of forming a groove on the support substrate 3 includes etching a silicon material, thereby forming such groove. Secondly, in order to form a V groove with its high processing precision, there can be used a method of grinding a flat substrate sintered by ceramics materials such as alumina, agate or ziconia or glass material, thereby forming each groove. In more detail, for example, a ceramics molder is sintered to manufacture a sintered body. This sintered body is flatly ground to form a flat face. Then, this flat face is ground by a diamond grinding stone, thereby forming each groove. Thirdly, a support substrate fixing groove can be formed by a press molding technique. As these glass materials, it is particularly preferable to use BK-7: optical glass, boron silicate glass, soda lime glass, ion exchange glass, or $LiO_2$—$Al_2O_3$—$SiO2$ based glass.

In the case where the support substrate 3 is made of a ceramics or glass, a metalized layer is formed at least at the surface of a groove in order to permeate a solder to the inside of the groove by directly wetting the solder relevant to the surface of the groove. In addition, in order to securely fix the support substrate 3 and the upper substrate 4 to each other by a, solder, a metalized layer is formed on a mutually abutment face. Although the material for the metalized layer is not limited in particular, it is preferable that the metalized layer be formed of a plurality of metal layers, and that a layer at the base side of the metalized layer is formed of a metal having good adhesive force relevant to the material for the support substrate. In addition, it is preferable that a layer on the surface of the metalized layer is made of a material identical to that of a solder to be used. In particular, gold or its allow is preferable. For example, it is desirable that a chrome layer/gold layer and a titanium layer/platinum layer/gold layer are provided in order from a base material for the support substrate. In addition, the thickness of the entire metalized layer is preferably 1.5 micron or less in view of improved positional precision of an optical axis of an optical fiber in a groove. The thickness is preferably 0.5 micron or more in view of improved wettability. For example, a titanium layer of 0.1 micron in thickness/a platinum layer of 0.1 micron in thickness/a gold layer of 1 micron in thickness are laminated sequentially.

Here, a metalized layer is not formed on the surface of a light transmission member such as optical fiber. An optical fiber for communication is generally made of quartz, and direct solder wet is unlikely to occur. Thus, a solder contracts during cooling or bonding, and pressurization is applied so as to strongly grip the optical fiber whose peripheral face is surrounded by the solder inwardly. In the case where this pressurization force is large, and there exists a gap in which a solder is not filled, the pressure from the solder is applied non-uniformly in the peripheral direction, and slight anisotropic property occurs with the material for the optical fiber. Thus, there has been a possibility that an optical signal propagating an optical fiber is affected. Because of this, a matelized layer is not formed on the surface of the optical fiber, whereby the pressurized and filled solder does not move fast in the longitudinal direction, and a gap is not produced. In this manner, the optical fiber is hardly affected by the pressure caused by such solder contraction.

Next, the core wire 8 of each optical fiber is housed in a groove 7 formed at the holding portion 3b of the support substrate 3. A solder sheet 8a is loaded on the top face of the holding portion 3b so as to cover the groove 7 and the optical fiber core wire 2b housed therein, and the upper substrate 4 is loaded on the solder sheet 8a. Then, the support substrate 3 is loaded on the hot plate 9, as shown in FIG. 4, and at least a portion of the solder sheet 8a is heated. During this heating, a predetermined upper pressure is applied as indicated by the arrow P.

The solder 8 fused from the upper solder sheet 8a is moved downwardly due to the pressure of the upper substrate 4. However, the solder moves with high wettability from the surface of the optical fiber 2 at which a metalized layer is not formed to the support substrate 3 on which the metalized layer 3c is formed. In particular, the solder 8 surrounding the peripheral face of the optical fiber 2 is small in wettability relevant to the optical fiber 2, and free of bonding force. Thus, before the solder wets along the, optical fiber 2, the solder is pressed by the force of pinching between the support substrate 3 and the upper substrate 4, moves in the peripheral direction, and is filled into the bottom of V groove 7. Therefore, no gap is provided between the optical fiber 2 and the groove 7 so that air tightness of the package or case for preventing degradation of an optical element such as laser could be reliably maintained. Then, the array position of the optical fibers could be fixed. Unlike a conventional example, the optical axis of the optical fiber deviates from that of the optical element, and thus, an increase or change in coupling loss does not occur.

After this heating process, the entirety of the optical fiber array 1 is removed from the hot plate 11, and the end face of the core wire 2b of each optical fiber 2 is optically ground. Then, each end face is exposed to the end face 6 of the holding portion 3b of the support substrate 3, and is finished to form an optical fiber. Then, this optical fiber array is connected to an optical element by means of a light transmission member, and is sealed in a package with air tightness. The sealed optical fiber array is used as a holding device of the light transmission member.

As has been described above, according to the present invention, an optical fiber array for fixing a light transmission member such as optical fiber at a predetermined position is characterized in that a light transmission member at which a metalized layer is not formed can be securely fixed into a groove by using a solder, and a gap in which a solder is not filled is unlikely to occur between this light transmission member and the groove.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. An optical fiber array comprising: a support substrate for housing a light transmission member in a fixing groove; and an upper substrate for holding the light transmission member, wherein a bare portion of said light transmission member on which a metalized layer is not formed is housed in said fixing groove of the support substrate on which a metalized layer is formed, and is soldered between the support substrate and the upper substrate on which another metalized layer is formed, said bare portion of said light transmission member having a surface roughness Ra of 0.1 to 1 micron.

* * * * *